(12) United States Patent
Suzuki et al.

(10) Patent No.: US 8,434,448 B2
(45) Date of Patent: May 7, 2013

(54) LUBRICATION STRUCTURE OF CRANKING ROTATIONAL FORCE TRANSMISSION MECHANISM FOR INTERNAL COMBUSTION ENGINE

(75) Inventors: Tomoaki Suzuki, Nagoya (JP); Toshiaki Asada, Mishima (JP); Makoto Ishikawa, Nishikamo-gun (JP); Toshimitsu Shiba, Toyota (JP); Kazuhito Sakai, Makinohara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/572,304

(22) Filed: Aug. 10, 2012

(65) Prior Publication Data

US 2012/0325177 A1    Dec. 27, 2012

Related U.S. Application Data

(62) Division of application No. 12/224,623, filed as application No. PCT/IB2007/001500 on Mar. 15, 2007, now Pat. No. 8,267,060.

(51) Int. Cl.
*F02N 19/00* (2010.01)
(52) U.S. Cl.
USPC ............... 123/196 R; 123/179.22; 74/7 C; 192/70.12; 184/6.3
(58) Field of Classification Search ............ 123/196 R, 123/179.22, 179.25; 184/6.3, 6.5; 74/7 C; 192/70.12, 85.61, 113.1, 113.34
See application file for complete search history.

(56) References Cited

U.S. PATENT DOCUMENTS

| 4,103,564 | A * | 8/1978 | Caldwell .................... 74/650 |
| 7,472,672 | B2 * | 1/2009 | Asada et al. ............ 123/179.25 |
| 7,485,066 | B2 | 2/2009 | Bailey et al. |
| 7,900,529 | B2 | 3/2011 | Suzuki et al. |
| 2009/0165593 | A1 | 7/2009 | Shiba et al. |
| 2009/0288295 | A1 | 11/2009 | Suzuki et al. |

FOREIGN PATENT DOCUMENTS

| DE | 409374 C | 2/1925 |
| DE | 103 43 400 A1 | 4/2005 |
| EP | 1 748 202 A2 | 1/2007 |
| JP | A-07-071351 | 3/1995 |
| JP | A-10-122107 | 5/1998 |

(Continued)

OTHER PUBLICATIONS

Oct. 12, 2007 International Search Report issued in International Patent Application No. PCT/IB2007/001500.

*Primary Examiner* — Noah Kamen
*Assistant Examiner* — Grant Moubry
(74) *Attorney, Agent, or Firm* — Oliff & Berridge, PLC (57) ABSTRACT

The lubricant-return holes are provided in the intermediate portion of the ring gear. Thus, the lubricant stagnating above the first oil sealing member can be easily discharged to the oil pan side via the lubricant-return holes even when the ring gear has stopped rotating in response to the starter motor being turned off after completion of the start of the internal combustion engine. As such, the level of the surface of lubricant stagnating between the ring gear and the outer race member does not rise, and therefore the lubricant surface virtually does not reach the outer race and the one-way clutch that are rotating while the internal combustion engine is running. Thus, bubbling of lubricant and production of sludge, which may otherwise be caused by agitation of the lubricant surface, can be prevented.

4 Claims, 8 Drawing Sheets

FOREIGN PATENT DOCUMENTS

| | | |
|---|---|---|
| JP | A-2000-274337 | 10/2000 |
| JP | A-2003-083216 | 3/2003 |
| JP | A-2006-057612 | 3/2006 |
| JP | A-2006-63913 | 3/2006 |
| JP | A-2007-032491 | 2/2007 |
| WO | WO 2006/016668 A1 | 2/2006 |

\* cited by examiner

LUBRICATION STRUCTURE OF CRANKING ROTATIONAL FORCE TRANSMISSION MECHANISM FOR INTERNAL COMBUSTION ENGINE

This is a Division of application Ser. No. 12/224,623 filed Sep. 2, 2008, which in turn is a National Phase of Application No. PCT/IB2007/001500 filed Mar. 15, 2007, which claims priority to Japanese Patent Application No. 2006-072896 filed Mar. 16, 2006. The disclosure of the prior applications is hereby incorporated by reference herein in its entirety.

BACKGROUND OF THE INVENTION

1. Field of the Invention

The invention relates to a lubrication structure of a cranking rotational force transmission mechanism for an internal combustion engine, which transmits the rotational force of a starter motor in one rotational direction to a rotational output shaft of the internal combustion engine via a one-way clutch and interrupts the transmission of the rotational force of the starter motor in the other rotational direction via the one-way clutch.

2. Description of the Related Art

As a cranking rotational force transmission mechanism for an internal combustion engine (e.g., an internal combustion engine for a vehicle) which transmits the rotational force of a starter motor to the crankshaft (i.e., rotational output shaft) of the internal combustion engine, JP-A-2000-274337 describes a mechanism in which the ring gear and the pinion gear on the starter motor side are arranged to be constantly in mesh with each other.

In such a constantly-meshed type cranking rotational force transmission mechanism for an internal combustion engine, a one-way clutch is provided between the ring gear and the crankshaft (a flywheel is also provided between the ring gear and the crack shaft in the cranking rotational force transmission mechanism described in JP-A-2000-274337). When the starter motor cranks the internal combustion engine, the rotational force of the starter motor is transmitted to the crankshaft via the one-way clutch. Then, in response to the crankshaft starting to rotate on the force output from the internal combustion engine, the one-way clutch is released and, hence, the rotational force of the crankshaft is not transmitted to the ring gear side.

In such a cranking rotational force transmission mechanism, lubricant needs to be supplied to the one-way clutch and other rotational components to lubricate and cool them. When the internal combustion engine is running, the components on the crankshaft side, such as the flywheel, rotate, however the ring gear that is connected to the internal combustion engine via the one-way clutch does not rotate. Therefore, the lubricant tends to stagnate in the ring gear side.

The more the lubricant stagnates in the ring gear side, the higher the possibility of the surface of the stagnant lubricant being strongly agitated by the rotating one-way clutch and flywheel which are located adjacent to the ring gear. Such agitation of the lubricant surface increases the likelihood of bubbling of the lubricant and production of sludge.

If the lubricant is bubbled and sludge is produced as mentioned above, the components, such as the one-way clutch and some bearings, may be damaged due to inappropriate lubrication and cooling by the lubricant, and the sealing performances of some sealing members may deteriorate due to the sludge being caught at them.

SUMMARY OF THE INVENTION

The invention provides a lubrication structure that prevents bubbling of lubricant and production of sludge due to agitation of the surface of lubricant in a cranking rotational force transmission mechanism that transmits the rotational force of a starter motor in one rotational direction to a rotational output shaft of an internal combustion engine and interrupts the transmission of the rotational force of the starter motor in the other rotational direction.

A first aspect of the invention relates to a lubrication structure of a cranking rotational force transmission mechanism for an internal combustion engine, the cranking rotational force transmission mechanism having: an outer race member that is coupled with a rotational output shaft of the internal combustion engine; a ring gear to which a rotational drive force is transmitted from a starter motor and a portion of which faces the outer race member from the side of the internal combustion engine; and a one-way clutch that is provided in a position across which the portion of the ring gear faces the outer race member and that transmits a rotational force of the starter motor in one rotational direction from the ring gear to the outer race member and interrupts transmission of a rotational force of the starter motor in the other rotational direction from the ring gear to the outer race member. The lubrication structure is characterized in that: a sealing member is provided which oil-seals a gap between the ring gear and the outer race member so that the one-way clutch is in an oil-sealed area in the internal combustion engine side; and a lubricant-return hole is formed in a portion of the ring gear between a portion of the ring gear at which the one-way clutch is provided and a portion of the ring gear at which the sealing member is provided, the lubricant-return hole penetrating the ring gear from one side to the other side.

In this structure, the lubricant-return hole is formed in the portion of the ring gear between where the one-way clutch is provided and where the sealing member is provided. Therefore, even when the ring gear has stopped rotating in response to the starter motor being turned off after completion of the start of the internal combustion engine, the lubricant stagnating between the ring gear and the outer race member that face each other above the sealing member is discharged to the internal combustion engine side through the lubricant-return hole. As such, an increase in the amount of the lubricant that stagnates between the ring gear and the outer race member is suppressed and thus the level of the stagnant lubricant surface can be kept low so that the lubricant surface does not reach the outer race member or so that the outer race member is not soaked deeply into the lubricant even if the lubricant surface reaches the outer race member. As such, bubbling of the lubricant and production of sludge, which may otherwise be caused by the lubricant surface being agitated by the rotating outer race member, can be prevented.

The lubricant structure according to the first aspect of the invention may be such that the lubricant-return hole is provided in plurality and the lubricant-return holes are formed around a rotational axis of the ring gear, such that, at any rotational phase of the ring gear, at least a part of one of the lubricant-return holes is present below a horizontal line that is drawn tangent to a lower side of an outer periphery of the outer race member.

By arranging the position of the lubricant-return holes as described above, the level of the surface of the lubricant that stagnates above the sealing member after the start of the internal combustion engine can be adjusted. Thus, the amount of lubricant that stagnates during the operation of the internal combustion engine can be constantly adjusted to an appropriate amount in a simple manner, and therefore bubbling of the lubricant and sludge production can be effectively prevented.

The lubricant structure according to the first aspect of the invention may be such that the lubricant-return hole is provided in plurality and the lubricant-return holes are formed around a rotational axis of the ring gear, such that, at any rotational phase of the ring gear, at least a part of one of the lubricant-return holes is present below a horizontal line that is drawn tangent to a lower side of an outer periphery of an outer race of the one-way clutch.

It is considered that the lubricant surface is strongly agitated by, in particular, the structural elements located on the radially inner side of the outer race of the one-way clutch. Thus, by arranging the positions of the lubricant-return holes as described above, the surface of the lubricant that stagnates above the sealing member after the start of the internal combustion engine can be adjusted and therefore bubbling of the lubricant and sludge production can be effectively prevented.

The lubricant structure according to the first aspect of the invention may be such that an outermost peripheral portion of the outer race member forms the outer race of the one-way clutch and an inner peripheral end of each of the lubricant-return holes is radially close to the outer race of the one-way clutch.

By arranging the inner peripheral end of each lubricant-return hole to be close to the outer race of the one way clutch as described above, the radial dimension of each lubricant return-hole can be made large enough to quickly discharge the lubricant that has been supplied to between the ring gear and the outer race member, which face each other above the sealing member. Thus, an increase in the amount of lubricant that stagnates above the sealing member can be suppressed.

Further, because the inner peripheral end of each lubricant-return hole is located close to the outer race, the sectional area of the lubricant passage leading to the lubricant-return holes is relatively small. Thus, a large amount of lubricant, under no circumstances, rapidly flows out from the one-way clutch side to the sealing member side. Therefore, it is possible to secure the lubricant of an amount needed for the one-way clutch and reduce the amount of lubricant that stagnates above the sealing member, so that bubbling of lubricant and production of sludge are prevented.

The lubricant structure according to the first aspect of the invention may be such that at least one of the position of each of the lubricant-return holes, the number of the lubricant-return holes, and the shape of each of the lubricant-return holes is set such that, when the internal combustion engine is running in a steady manner, the level of a surface of lubricant is below a level that is substantially aligned with a horizontal line that is drawn tangent to a lower side of the outer periphery of the outer race member.

By adjusting the level of the lubricant surface below the level that is substantially aligned with the horizontal line as described above, bubbling of lubricant and production of sludge can be sufficiently prevented.

The lubricant structure according to the first aspect of the invention may be such that the sealing member is slidably in contact with the outer periphery of the outer race of the outer race member from the radially outer side of the outer race and at least one of the position of each of the lubricant-return holes, the number of the lubricant-return holes, and the shape of each of the lubricant-return holes is set such that, the level of a surface of lubricant is, at least when the internal combustion engine is running in a steady manner, substantially aligned with a horizontal line that is drawn tangent to the lower side of a slide-contact portion between the outer race and the sealing member.

Because the level of the lubricant surface is substantially aligned with the horizontal line tangent to the lower side of the slide-contact portion between the outer race and the sealing member, it is possible to supply a sufficient amount of lubricant to the slide-contact portion between the outer race and the sealing member and thus lubricate and cool the sealing member adequately, while preventing bubbling of the lubricant and production of sludge which may otherwise be caused by agitation of the lubricant surface.

The lubricant structure according to the first aspect of the invention may be such that the lubricant-return hole is provided in plurality and the lubricant-return holes are formed such that any two of the lubricant-return holes are not located in phase positions, respectively, which are point-symmetrical to each other about the center of the ring gear.

When multiple lubricant-return holes are provided, a desired flexural strength of the entire part of the ring gear can be obtained by arranging the lubricant-return holes such that any two of the lubricant-return holes are not located in phase positions, respectively, which are point-symmetrical to each other about the center of the ring gear, and this prevents deformation of the ring gear and improves the reliability of the oil-sealing by the sealing member.

The lubricant structure according to the first aspect of the invention may be such that the ring gear has a spoke portion which is provided on the radially outer side of the portion where the sealing member is arranged and in which spokes and openings are alternately provided in the peripheral direction of the ring gear and the phase positions of the lubricant-return holes are arranged so as not to overlap phase positions at which the radial dimensions of the openings are maximum.

When a spoke portion is provided on the radially outer side of a portion of the ring gear at which the sealing member is provided, for the sake of, for example, reducing the weight and increasing the ease of assembly, the phase positions of the lubricant-return holes are arranged so as not to overlap phase positions at each of which the radial dimension of the opening between the spokes is maximum. As such, a desired flexural strength of the entire part of the ring gear can be obtained, which prevents deformation of the ring gear and improves the reliability of oil-sealing by the sealing member.

The lubricant structure according to the first aspect of the invention may be such that a sectional area A1 of a lubricant passage upstream of the one-way clutch, a sectional area A2 of a lubricant passage downstream of the one-way clutch, and a sectional area A3 of a lubricant passage in the lubricant-return hole are set such that $A1 \leq A2 \leq A3$ is true at any rotational phase of the ring gear.

With this arrangement, the relation among the flow rates V1, V2, V3 at the lubricant passages having the sectional areas A1, A2, A3, respectively, is $V1 \leq V2 \leq V3$ in a wide operation range of the internal combustion engine. As a result, an appropriate amount of lubricant can be supplied to the one-way clutch, and therefore the lubricant does not stagnate more than necessary in the space in which the one-way clutch is disposed. Thus, bubbling of lubricant and production of sludge, which may otherwise be caused by agitation of the lubricant surface in this space, can be prevented. Further, in the above structure, the amount of lubricant to be supplied to between the ring gear and the outer race member is suppressed, which also contributes to preventing bubbling of lubricant and production of sludge.

A second aspect of the invention relates to a lubrication structure of a cranking rotational force transmission mechanism for an internal combustion engine, the cranking rotational force transmission mechanism having: an outer race member that is coupled with a rotational output shaft of the internal combustion engine; a ring gear to which a rotational drive force is transmitted from a starter motor and a portion of which faces the outer race member from the side of the internal combustion engine; a one-way clutch that is provided in a position across which the portion of the ring gear faces the outer race member and that transmits a rotational force of the starter motor in one rotational direction from the ring gear to the outer race member and interrupts transmission of a rotational force of the starter motor in the other rotational direction from the ring gear to the outer race member; and a sealing member that oil-seals a gap between the ring gear and the outer race member so that the one-way clutch is in an oil-sealed area in the internal combustion engine side. In this lubrication structure, a lubricant-return hole is formed in a portion of the ring gear between a portion of the ring gear at which the one-way clutch is provided and a portion of the ring gear at which the sealing member is provided, the lubricant-return hole penetrating the ring gear from one side to the other side, and a wall is provided on the side of an oil pan of the internal combustion engine. Formed in this wall is a lubricant outlet hole through which lubricant that has been returned from the lubricant-return hole falls to the side of a lubricant storage of the oil pan. The lubricant outlet hole is shaped and positioned such that, when the internal combustion engine is running in a steady manner, the level of a surface of lubricant stagnating between the ring gear and the outer race member does not exceed a horizontal line that is drawn tangent to the lower side of the outer periphery of the outer race member.

In a case where a wall having a lubricant outlet hole is provided to prevent reverse flow of the lubricant from the oil pan side, by positioning and shaping the lubricant outlet hole as described above, it is possible to appropriately control the level of the surface of the lubricant stagnating between the ring gear and the outer race member while preventing reverse flow of the lubricant from the oil pan side. Thus, the lubricant surface can be prevented from being agitated by the outer race member, which prevents bubbling of lubricant and production of sludge.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EXEMPLARY EMBODIMENTS

Figure 1:
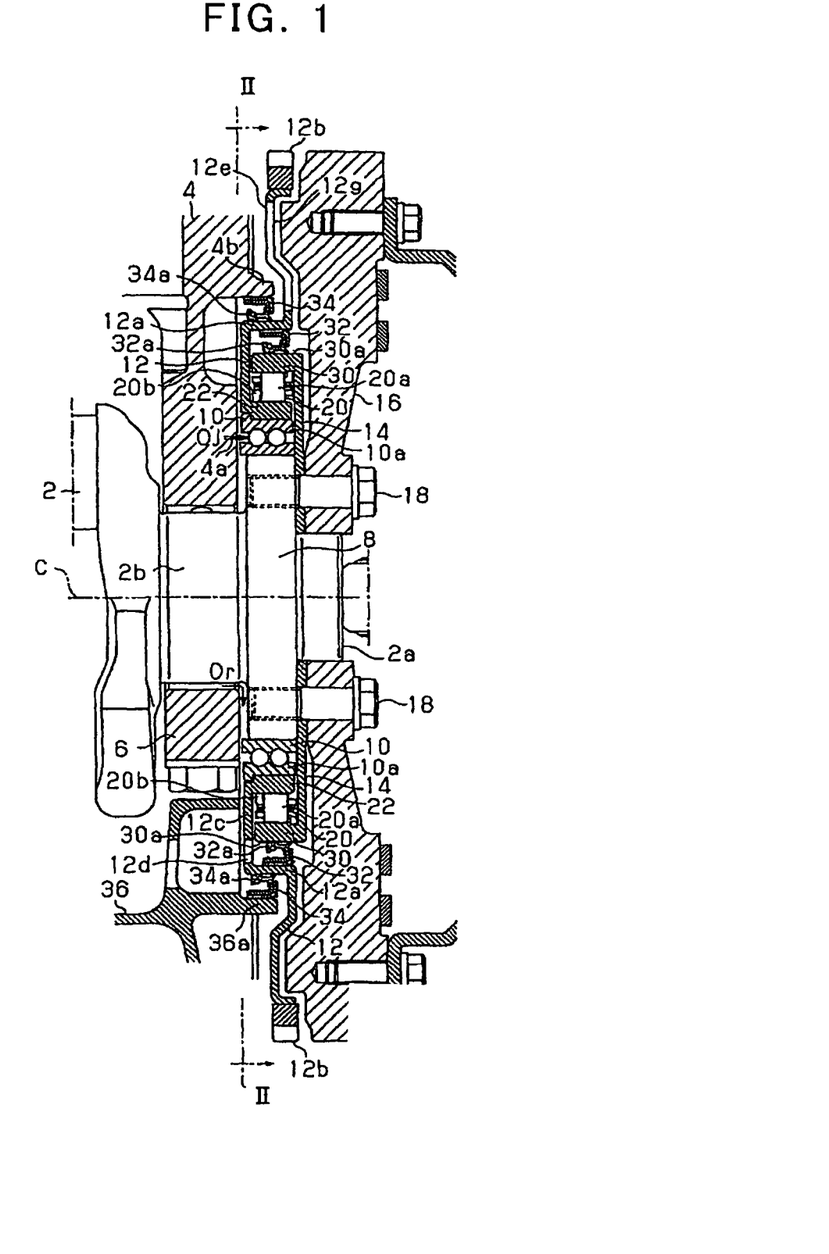
FIG. 1 is a longitudinal cross-sectional view showing a cranking rotational force transmission mechanism for an internal combustion engine for a vehicle according to the first exemplary embodiment.
Figure 2:
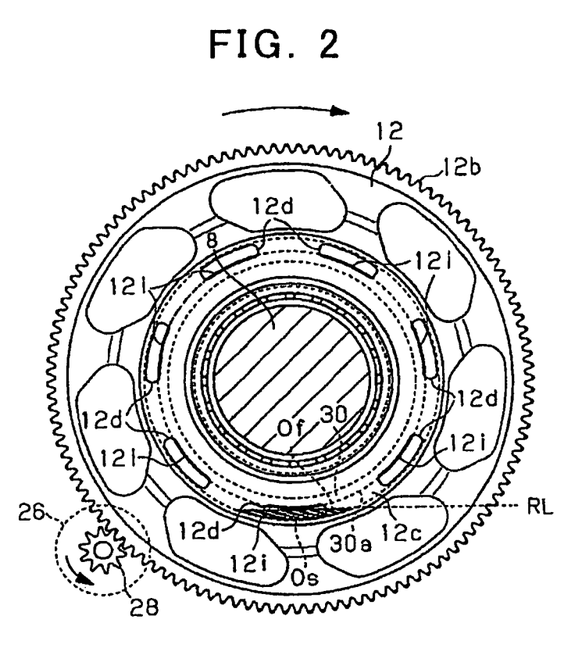
FIG. 2 is a cross-sectional view taken along the line II-II in FIG. 1.

FIG. 1 is a longitudinal sectional view showing a cranking rotational force transmission mechanism of the first exemplary embodiment that is provided near a rear end 2a of a crankshaft 2 of an internal combustion engine for a vehicle. The rear end 2a of the crankshaft 2 is the end of the crankshaft 2 on the side from which the rotational drive power of the internal combustion engine is output to a clutch or a torque converter. FIG. 2 is a cross-sectional view of the crankshaft 2 that is taken along the perpendicular plane II-II indicated in FIG. 1, as seen from the left side of FIG. 1, i.e., from the front side of the internal combustion engine.

A journal bearing is formed by a cylinder block 4 and a ladder beam 6. The crankshaft 2 is rotatably supported by the cylinder block 4 via a journal 2b. Thus, the crankshaft 2 is arranged such that the rear end 2a of the crankshaft 2 protrudes from the lower rear portion of the cylinder block 4. A ring gear 12 is provided on the peripheral surface of a large-diameter portion 8 formed at the rear end 2a of the crankshaft 2 with a rolling bearing, which is a ball bearing 10 in this exemplary embodiment, being interposed therebetween. An outer race member 14 and a flywheel (or a drive plate) 16 are fixed on the rear surface of the large-diameter portion 8 of the crankshaft 2 using bolts 18. Thus, the outer race member 14 and the flywheel 16 rotate together with the crankshaft 2.

Figures 3A, 3B, 3C:
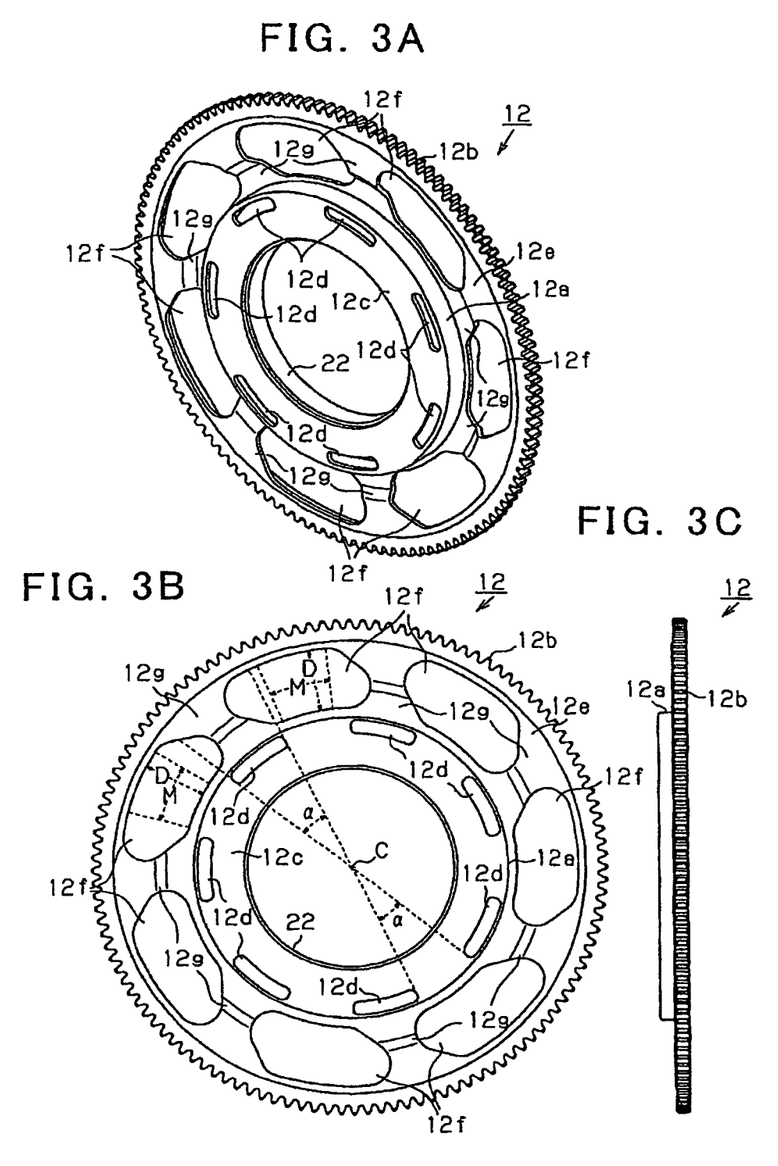
FIG. 3A to FIG. 3C are views showing the structure of the ring gear used in the cranking rotational force transmission mechanism of the first exemplary embodiment.
Figure 4A:
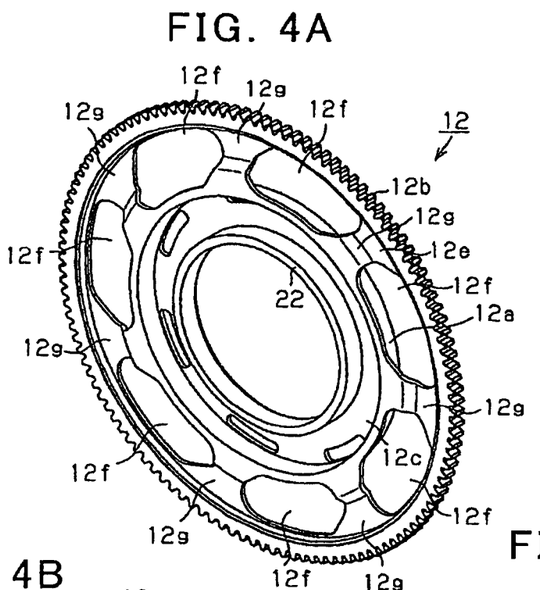
FIG. 4A to FIG. 4C are views showing the structure of the ring gear used in the cranking rotational force transmission mechanism of the first exemplary embodiment.
Figure 4B:
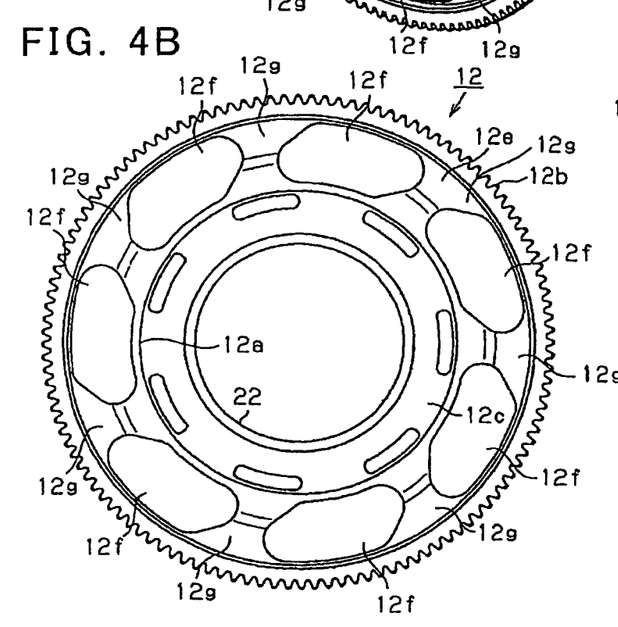
Figure 4C:
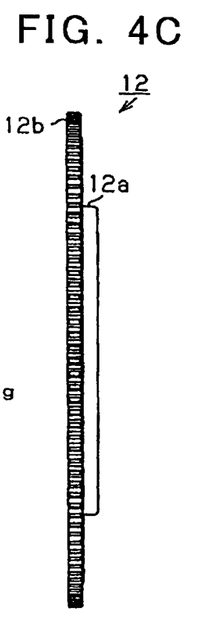

As shown in FIG. 3A to FIG. 3C and FIG. 4A to FIG. 4C, the ring gear 12 is a circular disk having a large opening at the center thereof and a bending portion 12a that radially bends at a right angle along the entire periphery. FIG. 3A is a perspective view showing the front side of the ring gear 12, FIG. 3B is a front view of the ring gear 12, FIG. 3C is a right side view of the ring gear 12, FIG. 4A is a perspective view showing the rear side of the ring gear 12, FIG. 4B is a rear view of the ring gear 12, and FIG. 4C is a left side view of the ring gear 12.

An inner race 22 for a one-way clutch 20 is formed like a flange at the inner peripheral edge of the ring gear 12. A gear portion 12b is formed like a ring at the outer periphery of the ring gear 12. The ring gear 12 is disposed, via the ball bearing 10 described above, on the outer periphery of the large-diameter portion 8 of the crankshaft 2 so as to be located on the opposite side of the one-way clutch 20, i.e., so as to be closer to the center side (i.e., the axis C side) than the one-way clutch 20 is. The ball bearing 10 is attached onto the outer periphery of the large-diameter portion 8 of the crankshaft 2 by press-fitting, and the inner race 22 is fitted to the outer periphery of the ball bearing 10. As such, when the one-way clutch 20 is in a released state, because of the ball bearing 10, the ring gear 12 can freely rotate independently of the rotation of the crankshaft 2.

Referring to FIG. 2, the gear portion 12b of the ring gear 12 is constantly in mesh with a pinion gear 28 that is provided at a position lower than the crankshaft 2 and is rotated by the a starter motor 26. That is, when cranking the internal combustion engine, the ring gear 12 is rotated by the rotational force of the starter motor 26 transmitted via the pinion gear 28.

Lubricant-return holes 12d are formed at an intermediate portion 12C between the inner race 22 and the bending portion 12a, which appears like a flat ring, so as to be located in a circle around the axis C at the same phase intervals. Each lubricant-return hole 12d penetrates the intermediate portion 12c from one side to the other side. Note that the intermediate portion 12c can be regarded as "a portion of the ring gear between a portion of the ring gear at which the one-way clutch is provided and a portion of the ring gear at which the sealing member is provided" as recited in the invention. In this exemplary embodiment, the number of the lubricant-return holes 12d is seven, and all the lubricant-return holes 12d are formed in the same shape. As shown in FIG. 3B, the lubricant-return holes 12d are shaped and positioned such that any lubricant-return hole 12d is not present in the region of the intermediate portion 12c that is point-symmetrical about the axis C to a phase region a occupied by other lubricant-return hole 12d.

Seven openings 12f are formed at an outer periphery portion 12e of the ring gear 12, which connects the bending portion 12a and the gear portion 12b. Between any two adjacent openings 12f is formed a spoke 12g. Having such a spoke portion comprised of the openings 12f and the spokes 12g, the ring gear 12 is made light in weight. The relative phase positions of the openings 12f and the lubricant-return holes 12d are such that each lubricant-return hole 12d and each spoke 12g are located in line with each other in the radial direction of the ring gear 12 and the width of each lubricant-return hole 12d is smaller than the width of the radially inner end of each spoke 12g, as shown in FIG. 3B. Thus, the phase position of each lubricant-return hole 12d and the phase position of the maximum width region M of each opening 12f, across which the dimension D of the opening 12f in the radial direction of the ring gear 12 is maximum, do not overlap with each other.

Figures 5A, 5B, 5C:
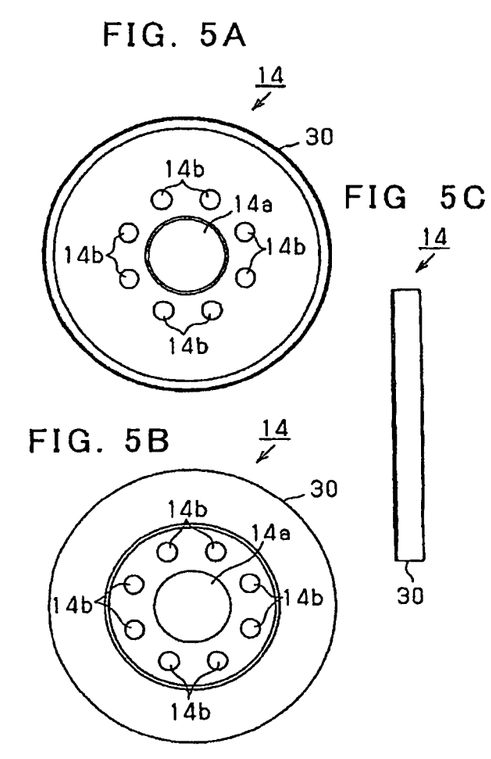
FIG. 5A to FIG. 5E are views showing the structure of the outer race member used in the cranking rotational force transmission mechanism of the first exemplary embodiment.
Figure 5D:
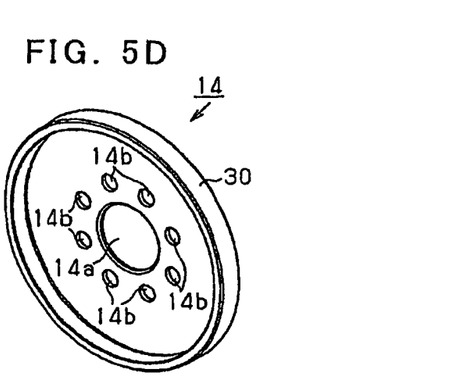
Figure 5E:
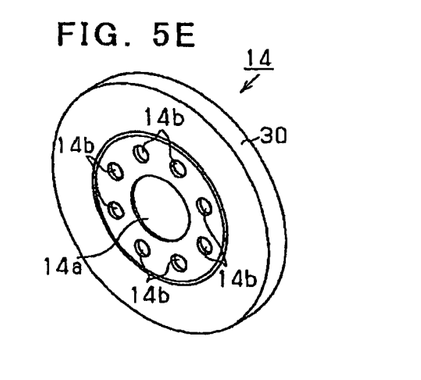

Referring to FIG. 5A to FIG. 5E, the outer race member 14 is a circular disk having an opening 14a formed at the center thereof and an outer race 30 for the one-way clutch 20 which is formed at the outermost periphery so as to protrude perpendicularly therefrom. Multiple bolt holes 14b, which are through holes into which bolts are inserted when bolting the outer race member 14 to the large-diameter portion 8 of the crankshaft 2, are formed in a circle around the opening 14a. In this exemplary embodiment, the number of the bolt holes 14b is eight. FIG. 5A is a front view of the outer race member 14, FIG. 5B is a rear view of the outer race member 14, FIG. 5C is a right side view of the outer race member 14, FIG. 5D is a perspective view showing the front side of the outer race member 14, and FIG. 5E is a perspective view showing the rear side of the outer race member 14.

That is, being attached to the side of the large-diameter portion 8 of the crankshaft 2 as described above, the outer race member 14 is arranged relative to the ring gear 12 such that the outer race 30 radially faces the inner race 22 of the ring gear 12, as shown in FIG. 1. During assembly, a cage 20b having a sprag 20a is put on the inner race 22 of the ring gear 12 when or before putting the outer race 30 in position, so that the sprag 20a is sandwiched between the inner race 22 and the outer race 30. This is how the one-way clutch 20 is assembled.

Being structured as describe above, the one-way clutch 20 engages the outer race member 14 and the ring gear 12 when the ring gear 12 is rotating in the direction to transmit the torque from the starter motor 26 to the outer race member 14 (the clockwise direction indicated by the arrow in FIG. 2), thus enabling the crankshaft 2 to be rotated by the starter motor 26. Then, when the rotation speed of the outer race member 14 rotating together with the crankshaft 2 exceeds the rotation speed of the ring gear 12 being rotated by the starter motor 26 after the internal combustion engine starts running on its own, the rotation of the ring gear 12 relative to the outer race member 14 becomes reverse rotation. Thus, the one-way clutch 20 is released. As such, although the pinion gear 28 and the ring gear 12 are constantly in mesh with each other, the starter motor 26 may be turned off after starting the internal combustion engine.

In order to lubricate the ball bearing 10 and the one-way clutch 20, lubricant Oj is supplied through a lubricant passage 4a in the cylinder block 4, as indicated by the arrow in FIG. 1, and the lubricant Oj is then injected towards the ball bearing 10. Also, lubricant Or is supplied to the slide surfaces of the journal 2b of the crankshaft 2 via lubricant passages in the cylinder block 4 and the crankshaft 2. Part of the lubricant Or flows to the ball bearing 10 side. The lubricants Oj, Or that have flown to the ball bearing 10 then pass through the inside of the ball bearing 10 and flow into the one-way clutch 20.

A first oil sealing member 32 and a second oil sealing member 34, which are ring-shaped sealing members, are provided to prevent the lubricants Oj, Or from leaking to the outside. The first oil sealing member 32 is interposed between the outer race 30 of the outer race member 14 and the bending portion 12a of the ring gear 12. The first oil sealing member 32 is fixed to the ring gear 12 by being fitted to the internal peripheral side of the bending portion 12a, so that a seal rip 32a that is formed at the internal periphery of the first oil sealing member 32 is slidably in contact with a sealed slide surface 30a that is the outer peripheral surface of the outer race 30, forming a slide-contact portion. Being thus arranged, the first oil sealing member 32 oil-seals between the outer race member 14 and the ring gear 12.

The second oil sealing member 34 is provided on the side of the bending portion 12a that is opposite to where the first oil sealing member 32 is provided (i.e., the radially outer side of the first oil sealing member 32). The second oil sealing member 34 is fixed at the position shown in the drawings by the portion of the second oil sealing member 34 above the crankshaft 2 being fitted mainly to the internal peripheral side of an arc-shaped seal fitting portion 4b of the cylinder block 4 and by the portion of the second oil sealing member 34 below the crankshaft 2 being fitted mainly to the internal peripheral side of an arc-shaped seal fitting portion 36a that is provided at the rear end of an oil pan 36, so that the seal rip 32a formed at the internal periphery of the second oil sealing member 34 is slidably in contact with the outer peripheral surface of the bending portion 12a. Being thus arranged, the second oil sealing member 34 oil-seals between the ring gear 12 and the internal combustion engine (i.e., the cylinder block 4 and the oil pan 36).

As mentioned above, when cranking the internal combustion engine, the starter motor 26 rotates the ring gear 12, and after the internal combustion engine starts running on its own, the ring gear 12 stops rotating due to the slippage at the one-way clutch 20. When the internal combustion engine is running, the lubricants Oj, Or, as described above, pass through the inside of the ball bearing 10 and reach the rotating outer race member 14. Then, the lubricants Oj, Or further proceed through the gap between an outer race 10a of the ball bearing 10 and the outer race member 14 and the gap between the inner race 22 and the outer race member 14, as indicated by the arrow F1 in FIG. 6, and then the lubricants Oj, Or flow into a space 21 in which the one-way clutch 20 is disposed, lubricating the one-way clutch 20.

Figure 6:
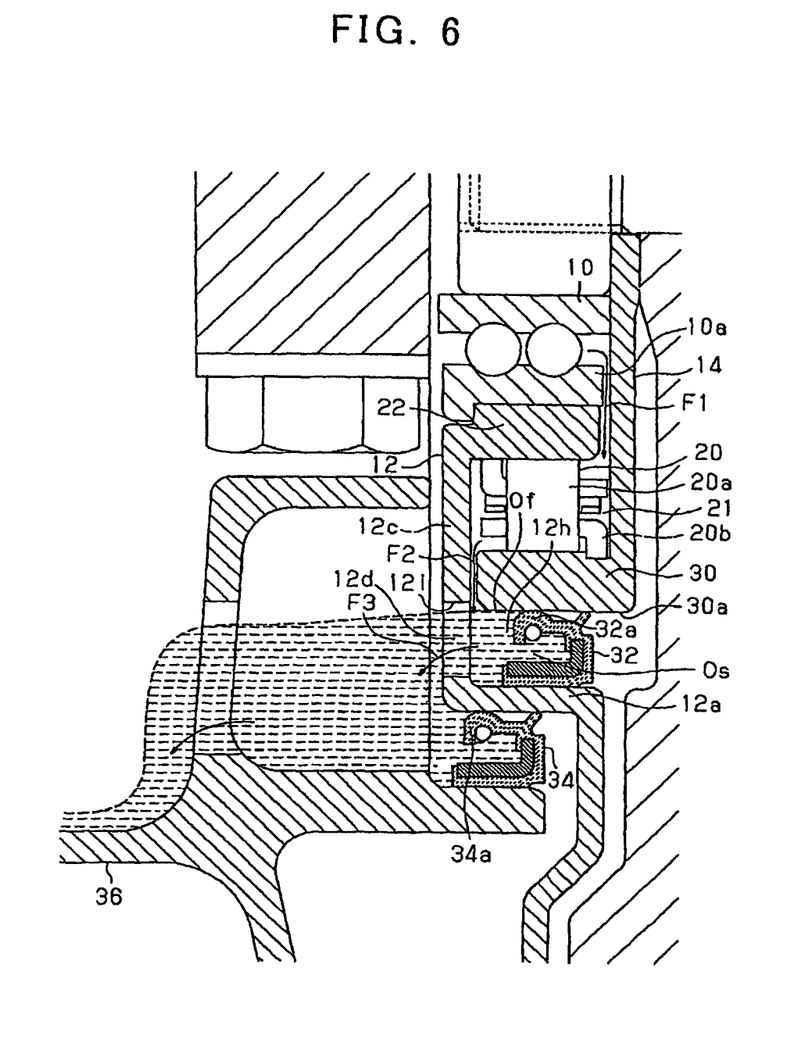
FIG. 6 is a longitudinal cross-sectional view illustrating how the lubricant flows in the cranking rotational force transmission mechanism of the first exemplary embodiment.

After lubricating the one-way clutch 20, the lubricants Oj, Or proceed through the gap between the outer race 30 and the intermediate portion 12c of the ring gear 12, as indicated by the arrow F2 in FIG. 6, and then flow into a space 12h that is provided above the bending portion 12a and in which the first oil sealing member 32 is disposed. The space 12h is oil-sealed from the outside by the first oil sealing member 32 fixed on the bending portion 12a. When the ring gear 12 is not rotating, the lubricant stagnates in a stagnation region OS in the space 12h above the bending portion 12a of the ring gear 12, which is hatched by the horizontal broken lines in FIG. 2 and FIG. 6.

However, in the intermediate portion 12c of the ring gear 12 which forms a wall of the stagnation region OS, the lubricant-return holes 12d are formed so as to penetrate the intermediate portion 12c from one side to the other side thereof, as described above. Therefore, in the state where the ring gear 12 is stopped at the rotational phase position indicated in FIG. 2, one of the lubricant-return holes 12d is located at the lowest position, and the lubricant in the space 12h returns to the oil pan 36 side via that lubricant-return hole 12d, as indicated by the arrow F3 in FIG. 6. When the internal combustion engine is running in a steady manner, due to the lubricant-return hole 12d at the lowest position, the level of the lubricant surface Of in the stagnation region OS remains substantially constant at a level slightly below a lowest position level RL of the sealed slide surface 30a of the outer race 30 (i.e., the horizontal line that is tangent to the lower side of the outer periphery of the outer race member 14).

Figure 7:
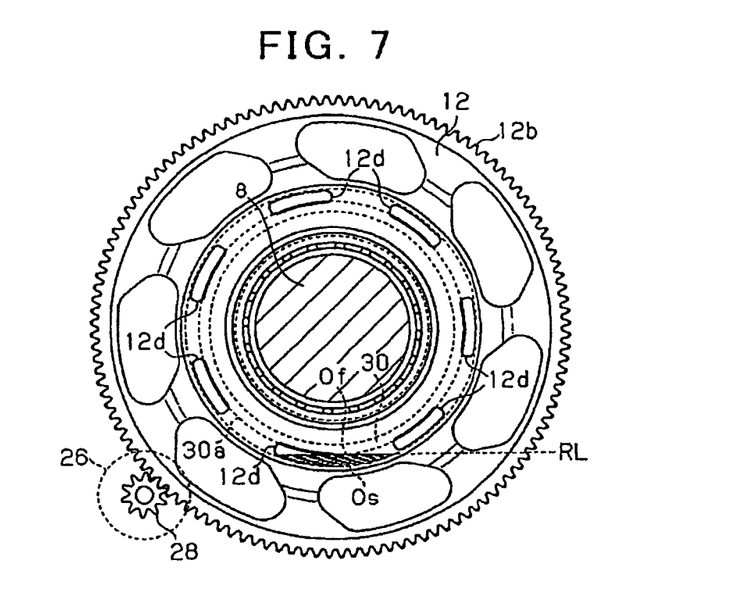
FIG. 7 is a view showing a state in which the ring gear is stopped at a different rotational phase in the cranking rotational force transmission mechanism of the first exemplary embodiment.
Figure 8:
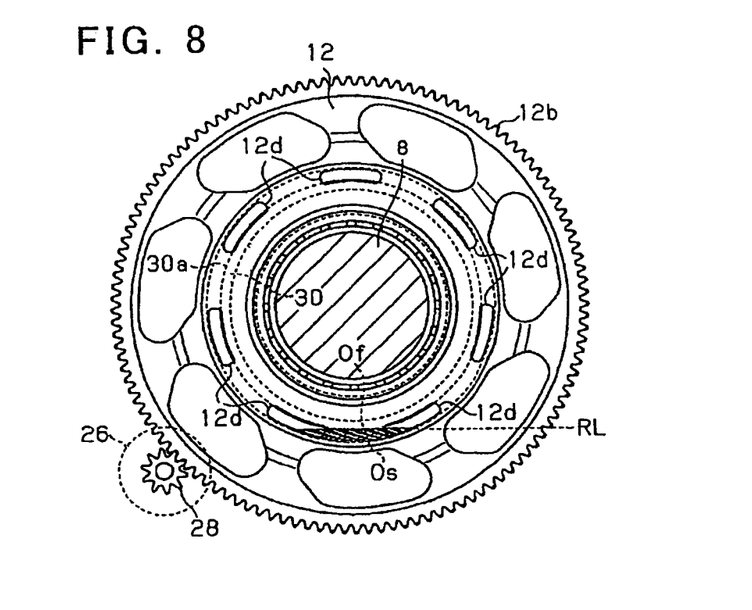
FIG. 8 is a view showing a state in which the ring gear is stopped at a different rotational phase in the cranking rotational force transmission mechanism of the first exemplary embodiment.

FIG. 7 and FIG. 8 each show an example in which the ring gear 12 is stopped at a different rotational phase position. As is evident from FIG. 2, FIG. 7, and FIG. 8, the positions, the number, and the shapes of the lubricant-return holes 12d are determined such that at least a part of one of the lubricant-return hole 12d is present below the lowest position level RL at any rotational phase of the ring gear 12.

In the example shown in FIG. 7, the level of the lubricant surface Of in the stagnation region OS depends upon the state of the single lubricant-return hole 12d that is present at the lowest position, as in the example shown in FIG. 2. However, because the position of that lubricant-return hole 12d, through which the lubricant returns to the oil pan 36 side, is slightly above the position of the lowest lubricant-return hole 12d in the example shown in FIG. 2. Thus, when the internal combustion engine is running in a steady manner, the lubricant surface Of remains substantially constant at a position slightly above the position at which the lubricant surface Of remains substantially constant in the example shown in FIG. 2. Note that, in the example shown in FIG. 7, the lubricant surface is at the same level as the lowest position level RL.

In the example shown in FIG. 8, two lubricant-return holes 12d are present at the lowest position, and therefore the lubricant surface Of in the stagnation region OS depends upon the states of these two lubricant-return holes 12d. Because each of the two lubricant-return holes 12d is located slightly above the position of the lowest lubricant-return hole 12d in the example shown in FIG. 7, the lubricant surface Of, when the internal combustion engine is running in a steady manner, remains substantially constant at a position slightly above the position at which the lubricant surface Of remains substantially constant in the example shown in FIG. 7.

As described above, the area of the portion of the lubricant-return hole 12d that is present below the lowest position level RL, when the internal combustion engine is running in a steady manner, is determined so that the level of the lubricant surface Of substantially matches the lowest position level RL. As such, when the internal combustion engine is running, in particular, when the internal combustion engine is running in a steady manner, any portion of the outer race 30 is not soaked deeply into the lubricant. That is, the lubricant is not heavily agitated by the components or portions that are rotating on the radially inner side with respect to the outer race 30. Meanwhile, the slide-contact portion between the seal rip 32a of the first oil sealing member 32 and the sealed slide surface 30a of the outer race 30 is located in the position which the lubricant is brought into contact with as the lubricant surface Of waves, even in the state where the level of the lubricant surface Of is as low as shown in FIG. 2.

When the level of the lubricant surface Of slightly goes down in the example shown in FIG. 2, the lubricant may not be brought into contact with the slide-contact portion even when the lubricant surface Of is waving. However, because an inner peripheral end 12i of each lubricant-return hole 12d is located near the outer race 30 as shown in FIG. 2, the lubricant flows through the narrow gap between the outer race 30 and the intermediate portion 12c of the ring gear 12, as indicated by the arrow F2 in FIG. 6, and the lubricant is then splashed into the space 12h from the narrow gap. Since the point from which the lubricant is splashed is located at the same level and thus is very close to the slide-contact portion, the lubricant reaches the slide-contact portion in the form of droplets.

The positions, the number, and the shapes of the lubricant-return holes 12d, which serve to adjust the level of the lubricant surface Of as described above, are determined such that a flow rate V2 at the lubricant passage indicated by the arrow F2 in FIG. 6 when the internal combustion engine is running in a steady manner is equal to a flow rate V3 at the lubricant passage indicated by the arrow F3 in FIG. 6 when the lubricant surface Of in the space 12h is substantially at the lowest position level RL of the sealed slide surface 30a. Specifically, for example, theoretical calculations are hydrodynamically performed based on the sectional areas of the lubricant passages indicated by the arrows F2, F3, the rotation speed of the outer race member 14 during the steady running of the internal combustion engine, the flow characteristics of the lubricant, and so on. Then, at least one of the position of each lubricant-return hole 12d, the number of the lubricant-return holes 12d, the shape of each lubricant-return hole 12d is determined based on the actual measurements of a sample for which the results of the theoretical calculations are taken into consideration. Alternatively, this determination may be made based on the actual measurements from the beginning. Further, the dimensions of the gap indicated by the arrow F2 may also be set.

Meanwhile, as described above, the capacity of returning the lubricant through the lubricant-return holes varies depending upon the rotational phase at which the ring gear 12 is stopped. Therefore, for example, each lubricant-return hole 12d may be formed such that a sectional area of the lubricant passage in the lubricant-return hole 12d is obtained when the ring gear 12 is stopped at a typical rotational phase, e.g., at the rotational phase shown in FIG. 7. Alternatively, each lubricant-return hole 12d may be formed such that the lubricant surface Of is substantially aligned with the lowest position level RL in the state where the sectional area of the lubricant passage in the lubricant-return hole 12d is minimum, such as when the ring gear 12 is at the rotational phase shown in FIG. 8.

The following advantageous effects can be obtained according to the first exemplary embodiment described above.

(1) Because the lubricant-return holes 12d are provided in the intermediate portion 12c of the ring gear 12, even when the ring gear 12 has stopped rotating in response to the starter motor 26 being turned off after completion of the start of the internal combustion engine, the lubricant stagnating above the first oil sealing member 32 can be easily returned to the internal combustion engine side, i.e., to the oil pan 36 side, via the lubricant-return holes 12d.

As such, the level of the lubricant surface Of the lubricant remaining between the ring gear 12 and the outer race member 14 does not rise. Therefore, the lubricant surface Of does not reach the outer race 30 and the one-way clutch 20 which are rotating while the internal combustion is running, and even if the lubricant surface Of reaches them, the one-way clutch 20 and the outer race 30 are not deeply soaked into the lubricant. As such, bubbling of lubricant and production of sludge, which may otherwise be caused by agitation of the lubricant surface Of, can be prevented.

(2) At least a part of one of the lubricant-return holes 12*d* is present below the lowest position level RL, which corresponds to the lower side of the outer periphery of the outer race member 14 (i.e., the sealed slide surface 30*a*), at any rotational phase of the ring gear 12. Therefore, the lubricant surface Of that has been present above the first oil sealing member 32 is appropriately adjusted by the lubricant-return holes 12*d* after the start of the internal combustion engine. Thus, bubbling of lubricant and production of sludge can be prevented.

Further, because the lubricant-return holes 12*d* are set such that the level of the lubricant surface Of is substantially aligned with the lowest position level RL, the amount of lubricant that stagnates above the first oil sealing member 32 can be effectively reduced. Thus, bubbling of lubricant and production of sludge, which may otherwise be caused by agitation of the lubricant surface Of, can be prevented, and the portion between the outer race 30 and the first oil sealing member 32 can be sufficiently cooled and lubricated.

(3) The inner peripheral end 12*i* of each lubricant-return hole 12*d* is radially located near the outer race 30. Therefore, the radial dimension of each lubricant-return hole 12*d* can be made large enough to quickly discharge the lubricant that has been supplied to the space 21 in which the one-way clutch 20 is disposed and which is located above the first oil sealing member 32. As such, an increase in the amount of lubricant that stagnates above the first oil sealing member 32 can be suppressed.

Further, because the gap between the ring gear 12 and the outer race member 14 is narrow at the internal peripheral end 12*i* of the ring gear 12, under no circumstance, a large amount of lubricant rapidly flows out from the space 21 in which the one-way clutch 20 is disposed. Therefore, it is possible to secure the lubricant of an amount needed for the one-way clutch 20 and reduce the amount of lubricant that stagnates above the first sealing member 32. Thus, bubbling of lubricant and production of sludge, which may otherwise be caused by agitation of the lubricant surface Of, can be prevented.

(4) The lubricant-return holes 12*d* are arranged such that any lubricant-return hole 12*d* is not located at a position that is point-symmetrical to other lubricant-return hole 12*d* about the center of the ring gear 12 (the axis C). With this arrangement, the necessary flexural strength of the entire part of the ring gear 12 can be obtained without increasing the rigidity of the ring gear 12 by, for example, increasing the thickness of the ring gear 12, and therefore the ring gear 12 can be made light in weight.

(5) As described above, the spoke portion is provided in the radially outer side of the first oil sealing member 32 for the sake of reducing the weight and increasing the ease of assembly, and the phase position of each lubricant-return hole 12*d* is set so as not to overlap the phase position at which the radial dimension of the opening 12*f* is maximum (maximum width region M). According to this structure, a desired flexural strength of the entire part of the ring gear 12 can be obtained, which prevents deformation of the ring gear 12 and thereby improves the reliability of oil-sealing by the first oil sealing member 32 and the second oil sealing member 34. As such, the rigidity of the ring gear 12 can be made enough to prevent low-frequency resonance when the internal combustion engine is running in a steady manner.

In the second exemplary embodiment, the relation between the sectional area A1 of the lubricant passage that is indicated by the arrow F1 in FIG. 6 and is located upstream of the one-way clutch 20 and the sectional area A2 of the lubricant passage that is indicated by the arrow F2 in FIG. 6 and is located downstream of the one-way clutch 20 is $A1 \leq A2$. Thus, the relation between the flow rate V1 at the lubricant passage indicated by the arrow F1 and the flow rate V2 at the lubricant passage indicated by the arrow F2 can be maintained to be $V1 \leq V2$ in a wide operation range of the internal combustion engine.

Further, the relation between the sectional area A2 of the lubricant passage downstream of the one-way clutch 20 and the sectional area A3 of the lubricant passage in the lubricant-return hole 12*d*, which is indicated by the arrow F3 in FIG. 6, is $A2 \leq A3$ at any rotational phase of the ring gear 12. Thus, the relation between the flow rate V2 at the lubricant passage indicated by the arrow F2 and the flow rate V3 at the lubricant passage indicated by the arrow F3 can be maintained to be $V2 \leq V3$ in a wide operation range of the internal combustion engine.

That is, the relation between the sectional areas of the lubricant passages in the respective gaps and lubricant-return holes 12*d* is set to be $A1 \leq A2 \leq A3$, so that the relation between the flow rates V1, V2, V3 can be maintained to be $V1 \leq V2 \leq V3$ in a wide operation range of the internal combustion engine.

Other structures in the second exemplary embodiment are the same as those in the first exemplary embodiment. According to the second exemplary embodiment described above, the following advantageous effects can be obtained.

(1) Because the relation among the flow rates V1, V2, V3 can be maintained to be $V1 \leq V2 \leq V3$ in a wide operation range of the internal combustion engine, an appropriate amount of lubricant can be supplied to the one-way clutch 20, and therefore the lubricant does not stagnate in the space 21. Thus, bubbling of lubricant and production of sludge, which may otherwise be caused by agitation of the lubricant surface in the space 21, can be prevented.

Further, in the structure described above, the lubricant does not stagnate in the space 12*h* above the first oil sealing member 32, and therefore bubbling of lubricant and production of sludge, which may otherwise be caused by agitation of the lubricant surface in the space 12*h*, can be prevented. Note that, as mentioned in connection with the first exemplary embodiment, the lubricant is splashed into the space 12*h* from the narrow gap between the outer race 30 and the intermediate portion 12*c* of the ring gear 12, which is indicated by the arrow F2 in FIG. 6. Therefore, the lubricant reaches, in the form of droplets, the slide-contact portion between the seal rip 32*a* of the first oil sealing member 32 and the sealed slide surface 30*a* of the outer race 30, so that the slide-contact portion is lubricated and cooled.

Figure 9:
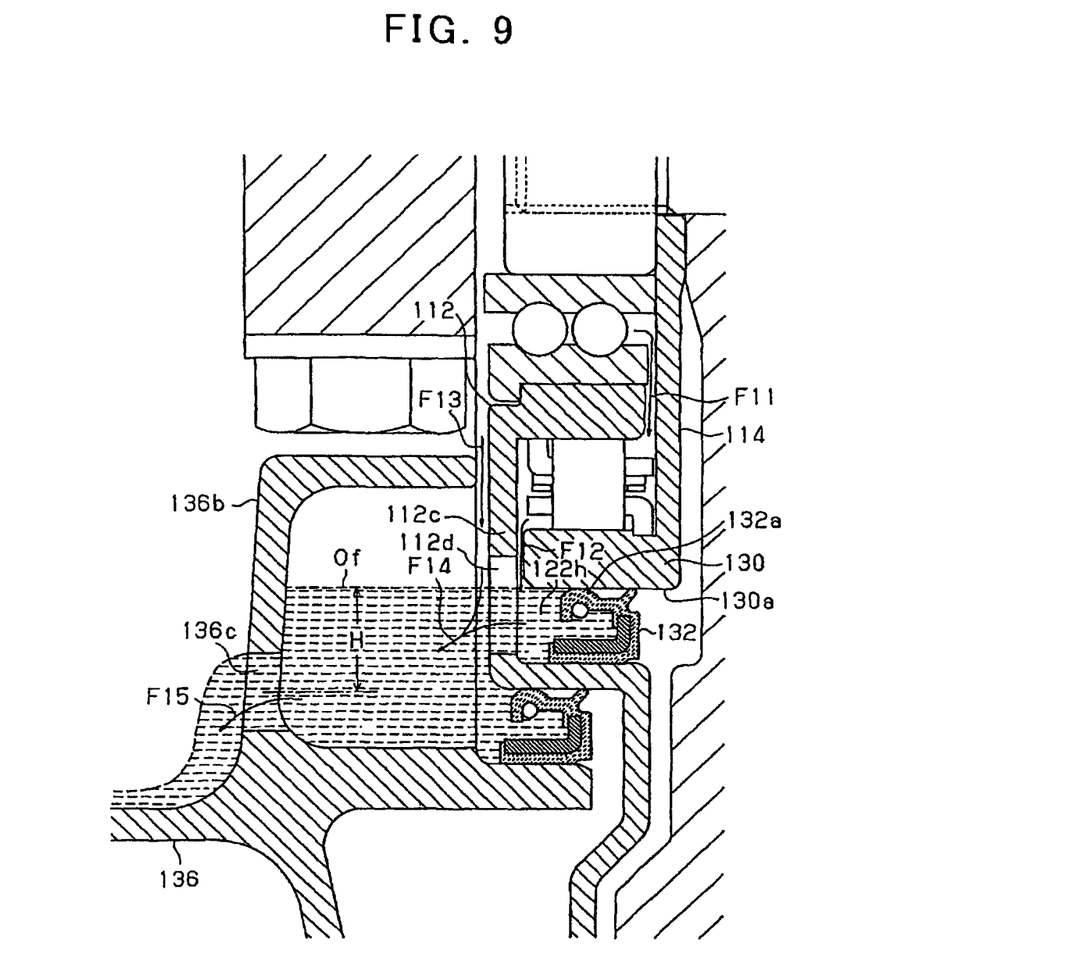
FIG. 9 is a longitudinal cross-sectional view illustrating how the lubricant flows in the cranking rotational force transmission mechanism of the third exemplary embodiment.

In the third exemplary embodiment, as shown in FIG. 9, the sectional area of each lubricant-return hole 112*d* of the ring gear 112 is so large that the lubricant-return hole 112*d* does not serve to adjust the level of the lubricant surface Of in the space 122*h* above the first oil sealing member 132. Instead, the adjustment of the level of the lubricant surface Of is accomplished by the position (i.e., the sectional area A1) and shape (i.e., the height H) of a lubricant outlet hole 136*c* that is formed in a wall 136*b* of the oil pan 136 so as to face the lubricant-return hole 112*d*.

Specifically, the lubricant outlet hole 136*c* is positioned and shaped such that a flow rate V14 at the lubricant passage indicated by the arrow F14 in FIG. 9 and a flow rate V15 at the lubricant passage indicated by the arrow F15 in FIG. 9 are equal with each other in the state where the level of the lubricant surface Of is lower than the sealed slide surface 130a of the outer race 130 when the internal combustion engine is running in a steady manner. That is, the lubricant outlet hole 136c is positioned and shaped such that, when the internal combustion engine is running in a steady state, the level of the lubricant surface Of lubricant stagnating between the ring gear 112 and the outer race member 114 does not exceed the horizontal line that is tangent to the lower side of the sealed slide surface 130a of the outer race 130. Note that FIG. 9 shows the state in which the lubricant surface Of and the horizontal line are at the same level. Also, note that the flow rate V14 at the lubricant passage indicated by the arrow F14 is equal to the sum of the flow rate V12 at the lubricant passage indicated by the arrow F12 (or F11) and the flow rate V13 at the lubricant passage indicated by the arrow F13.

For example, the sectional area A15 of the lubricant outlet hole 136c and the height H from the lubricant outlet hole 136c to the sealed slide surface 130a are set such that the relation among the flow rate V14, the sectional area A15, the height H, and the flow rate coefficient Cf of the lubricant satisfies Inequality (1) shown below.

$$V14 \leq Cf \cdot A15 \sqrt{(2gH)} \qquad (1)$$

where $\sqrt{(\ )}$ is an operator indicating the square root of the value in the parentheses and g represents the gravitational acceleration. The right side of Inequality (1) represents the amount of lubricant that is discharged via the lubricant outlet hole 136c per unit time, i.e., the flow rate V15.

Other structures in the third exemplary embodiment are the same as those in the first exemplary embodiment. According to the third exemplary embodiment, the following advantageous effects can be obtained.

(1) By using the lubricant outlet hole 136 in place of the lubricant-return holes 112d, it is possible to control the level of the lubricant surface Of the lubricant stagnating between the ring gear 112 and the outer race member 114 while preventing reverse flow of the lubricant from the oil pan 136 side. Thus, the lubricant surface Of can be prevented from being agitated by the outer race member 114, and therefore prevents bubbling of lubricant and production of sludge can be prevented.

Further, in the structure of the third exemplary embodiment, even when the level of the lubricant surface Of is set below the foregoing horizontal line, because the lubricant is splashed from the narrow gap between the outer race 130 and the intermediate portion 112c of the ring gear 112, which is indicated by the arrow F12 in FIG. 9, the lubricant reaches, in the form of droplets, the slide-contact portion between the seal rip 132a of the first oil sealing member 132 and the sealed slide surface 130a of the outer race 130, so that the slide-contact portion is lubricated and cooled.

The present invention is not limited to the embodiments described above but may be modified into the following alternative embodiments.

While the lubricant-return holes are provided at the same phase intervals in each of the exemplary embodiments described above, the lubricant-return holes may not be provided at the same phase intervals. That is, even if the lubricant-return holes are not provided at the same phase intervals, the advantageous effect (4) that has been descried above in connection with the first exemplary embodiment can be obtained by arranging the positions of the respective lubricant-return holes such that any lubricant-return hole is not located at a position that is point-symmetrical to another lubricant-return hole about the center of the ring gear. That is, forming an odd number of lubricant-return holes at the same phase intervals in the intermediate portion of the ring gear provides an arrangement of the lubricant-return holes in which any lubricant-return hole is not located at a position that is point-symmetrical to another lubricant-return hole about the center of the ring gear. Such an arrangement of the lubricant-return holes can be obtained also by forming an even number of lubricant-return holes at uneven intervals such that any lubricant-return hole is not located at a position that is point-symmetrical to another lubricant-return hole about the center of the ring gear.

The same applies to the relation between the lubricant-return holes and the openings formed in the spoke portion. That is, even when the lubricant-return holes are provided at uneven intervals, the advantageous effect (5) that has been described above in connection with the first exemplary embodiment can be obtained by arranging the positions of the lubricant-return holes and the positions of the openings of the spoke portion such that the phase position of each lubricant-return hole does not overlap the phase position of the portion of each opening in the spoke portion at which the radial dimension of the same opening is maximum.

While the level of the lubricant surface Of is substantially aligned with the horizontal line tangent to the lower side of the sealed slide surface (i.e., the lowest position level RL) in the first exemplary embodiment, if lubrication and cooling of the first oil sealing member are not directly performed by the lubricant surface Of, the level of the lubricant surface Of may be set below the lowest position level RL.

For example, the level of the lubricant surface Of may be set below the lowest position level RL in a structure in which the lubricant is splashed from the narrow gap between the outer race and the intermediate portion of the ring gear (i.e., the gap indicated by the arrow F2, the gap indicated by the arrow F12) so that the lubricant reaches, in the form of droplets, the seal rip of the first oil sealing member and the sealed slide surface of the outer race, as in the second and third exemplary embodiments.

While the outer periphery of the outer race member is the outer race of the one-way clutch in each of the exemplary embodiments described above, if there is any part or portion that protrudes outward from the outer periphery of the outer race member, the structures in the respective exemplary embodiments may be designed by using the horizontal line that is tangent to the protruding part or portion as the lowest position level RL. Nevertheless, if the structural elements of the outer race member that are present on the radially inner side of the outer race are significantly responsible for agitation of the lubrication surface Of, the lubricant surface Os may be set with respect to the outer peripheral surface of the outer race, as it is in the respective exemplary embodiments described above.

In each of the exemplary embodiments, the outer race member may be provided as a part of the flywheel (or the drive plate), rather than as an independent member. That is, the flywheel (or the drive plate) and the outer race member may be provided as a single component by forming a portion of the flywheel (or the drive plate) as an outer race. In this case, the flywheel (or the drive plate) corresponds to the outer race member.

While the invention has been described with reference to the example embodiment thereof, it is to be understood that the invention is not limited to the example embodiment and construction. To the contrary, the invention is intended to cover various modifications and equivalent arrangements. In addition, while the various elements of the example embodiment are shown in various combinations and configurations, which are exemplary, other combinations and configurations, including more, less or only a single element, are also within the sprit and scope of the invention.

The invention claimed is:

1. A lubrication structure of a cranking rotational force transmission mechanism for an internal combustion engine, the cranking rotational force transmission mechanism having an outer race member that is coupled with a rotational output shaft of the internal combustion engine; a ring gear to which a rotational drive force is transmitted from a starter motor and a portion of which faces the outer race member from a side of the internal combustion engine; and a one-way clutch that is provided in a position across which the portion of the ring gear faces the outer race member and that transmits a rotational force of the starter motor in one rotational direction from the ring gear to the outer race member and interrupts transmission of a rotational force of the starter motor in the other rotational direction from the ring gear to the outer race member, the lubrication structure comprising:

a sealing member that is provided to oil-seal a gap between the ring gear and the outer race member so that the one-way clutch is in an oil-sealed area in the internal combustion engine side; and a lubricant-return hole that is formed in a portion of the ring gear between a portion of the ring gear at which the one-way clutch is provided and a portion of the ring gear at which the sealing member is provided, the lubricant-return hole penetrating the ring gear from a first side to a second side;

wherein the ring gear has a spoke portion which is provided on the radially outer side of the sealing member and in which spokes and openings are alternately provided in a peripheral direction of the ring gear, and wherein phase positions of the lubricant-return holes are arranged so as not to overlap phase positions at which the radial dimensions of the openings are maximum.

2. The lubrication structure according to claim 1, wherein a sectional area A1 of a lubricant passage upstream of the one-way clutch, a sectional area A2 of a lubricant passage downstream of the one-way clutch, and a sectional area A3 of a lubricant passage in the lubricant-return hole are set such that $A1 \leq A2 \leq A3$ is true at any rotational phase of the ring gear.

3. The lubrication structure according to claim 1, further comprising a wall which is provided on the side of an oil pan of the internal combustion engine the wall having a lubricant outlet hole formed therein, wherein lubricant that has been returned from the lubricant-return hole falls to the side of a lubricant storage of the oil pan through the lubricant outlet hole, wherein the lubricant outlet hole is shaped and positioned such that when the internal combustion engine is running in a steady manner, the level of a surface of lubricant stagnating between the ring gear and the outer race member does not exceed a horizontal line that is drawn tangent to the lower side of the outer periphery of the outer race member.

4. The lubrication structure according to claim 3, wherein $V14 \leq Cf \cdot A15 \sqrt{(2gH)}$ is true where V14 is a flow rate of lubricant flowing to the lubricant outlet hole, A15 is the sectional area of a lubricant passage in the lubricant outlet hole, H is the height from the lubricant outlet hole to a sealed slide surface of the sealing member at which the sealing member slidably contacts the outer race member, g is a gravitational acceleration, and cf is a flow rate coefficient of lubricant.

* * * * *